(12) United States Patent
Matsumura et al.

(10) Patent No.: US 8,447,838 B2
(45) Date of Patent: May 21, 2013

(54) SYSTEM AND METHOD FOR PROVIDING MOBILE SERVICE

(75) Inventors: Jun Matsumura, Tokyo (JP); Takahito Matsushima, Tokyo (JP)

(73) Assignee: Bizmobile Inc., Tokyo (JP)

( * ) Notice: Subject to any disclaimer, the term of this patent is extended or adjusted under 35 U.S.C. 154(b) by 324 days.

(21) Appl. No.: 12/864,776

(22) PCT Filed: Jan. 30, 2009

(86) PCT No.: PCT/JP2009/051653
§ 371 (c)(1),
(2), (4) Date: Jul. 27, 2010

(87) PCT Pub. No.: WO2009/096561
PCT Pub. Date: Aug. 6, 2009

(65) Prior Publication Data
US 2010/0318636 A1 Dec. 16, 2010

(30) Foreign Application Priority Data
Jan. 31, 2008 (JP) ................................. 2008-022096

(51) Int. Cl.
*G06F 15/16* (2006.01)
(52) U.S. Cl.
USPC ........................................................ 709/219
(58) Field of Classification Search
USPC ..................... 709/219, 220; 455/418
See application file for complete search history.

(56) References Cited

U.S. PATENT DOCUMENTS 7,450,936 B2 * 11/2008 Kim .............................. 455/418
7,784,048 B2 * 8/2010 Asai et al. ..................... 717/178

FOREIGN PATENT DOCUMENTS

| JP | 10-177552 A | 6/1998 |
| JP | 2000-250872 A | 9/2000 |
| JP | 2001-282742 A | 10/2001 |
| JP | 2002-7603 A | 1/2002 |
| JP | 2002-176637 A | 6/2002 |
| JP | 2002-22372 A | 8/2002 |
| JP | 2002-351781 A | 12/2002 |
| JP | 2004-320210 A | 11/2004 |
| JP | 2005-135173 A | 5/2005 |
| JP | 2007-11584 A | 1/2007 |
| JP | 2007-164661 A | 6/2007 |

OTHER PUBLICATIONS

International Search Report dated Mar. 10, 2009 in corresponding international patent application No. PCT/JP2009/051653, 2 pages.

* cited by examiner

*Primary Examiner* — Adnan Mirza
(74) *Attorney, Agent, or Firm* — Maier & Maier PLLC

(57) ABSTRACT

A system for providing mobile service comprises an application executing section for executing an application, a component section for transmitting the result of the execution of the application to a mobile terminal on the basis of the operation data in the mobile terminal and allowing the application to be remotely operated in the mobile terminal, an authentication section for authenticating the user, a service management section for storing the configuration file or data file of the application, providing the file to the mobile terminal and regulating the connection with the component section according to the result of the authentication, and an application operation section for receiving and displaying the result of the execution in the application executing section on the mobile terminal, and transmitting the operation data in response to a user operation.

23 Claims, 17 Drawing Sheets (a)

(b)

SYSTEM AND METHOD FOR PROVIDING MOBILE SERVICE

RELATED APPLICATIONS

This application is the U.S. national stage application, which claims priority under 35 U.S.C. §119, to international patent application No.: PCT/JP2009/051653, filed on Jan. 30, 2009, which claims priority to Japanese patent application No.: 2008-022096, filed Jan. 31, 2008, the disclosures of which are incorporated by reference herein in their entireties.

TECHNICAL FIELD

The present invention relates to a system and method for providing mobile service including a plurality of mobile terminals and a communication server which can be accessed from the mobile terminals.

BACKGROUND ART

In recent years, mobile terminals are provided with the functionality of running applications such that it becomes possible to add functions to the mobile terminals by installing applications. The applications can be obtained by performing a purchase procedure through the communication capability provided in the mobile terminal, and downloading each application from a content server which is located in a communication network.

In a conventional mobile terminal, the user performs the following steps for performing the process of downloading and saving data, and the process of invoking an application program. For example, as shown in Patent Document 1, first, the user sets character data as an anchor corresponding to the data to be downloaded. The mobile terminal performs the process of downloading data, usually, in response to the one button operation of pressing a predetermined key for a short time for starting download operation. By this process, the downloaded data is stored in a memory area of the mobile terminal.

Then, after completing the download process, the user instructs the mobile terminal to invoke the application program using the downloaded data in a stepwise interactive manner, and then the mobile terminal performs the initialization process of the application program such that the downloaded data is processed by the application program.

PRIOR ART LITERATURE

Patent Document 1: Japanese Patent Published Application No. 2002-223272

DISCLOSURE OF THE INVENTION

Problem to be Solved by the Invention

However, in the method as described above, the user has to perform a sequence of steps and operations for purchasing, downloading and installing a necessary application. There is a problem that this procedure is cumbersome.

Particularly, in the case where an organization such as a company has employees and members thereof possess mobile terminals respectively as company communication equipment, there is a problem in that employee management is significantly complicated such as installing and setting of necessary applications, distribution of necessary shared data which is needed, the support and maintenance of the applications and data, that such employee management is a burden to the company and the like, and that the employees or the like can not immediately start using the distributed mobile terminals.

In order to solve the problem as described above, it is an object of the present invention to provide a system and method for providing mobile service in which it is possible to easily create an environment in which the management to employees and members thereof, including the installation or the settings of necessary applications, the delivery of other necessary shared data, and supports and maintenance therefor are centralized for example when an organization such as a company has employees and members thereof possess mobile terminals respectively as company communication equipment, and further realize expansive additional service by the use of this mechanism.

Solution to Problems

In order to accomplish the object as described above, the present invention provides a system for providing mobile service including a plurality of mobile terminals and a communication server which can be accessed from the mobile terminals, the system comprising: an application executing section connected to the communication server and operable to execute the executable file of an application; a component section operable to execute the application by the application executing section on the basis of operation data from the mobile terminal, and transmit the execution result to the mobile terminal so that the application running on the communication server can remotely be controlled by the mobile terminal; an authentication section operable to perform authentication of the user of each of the mobile terminals; a service management section operable to accumulate either of a configuration file of the application and a data file to be used by the application, and provide the configuration file or the data file to the mobile terminal in accordance with the authentication result from the authentication section, and control connection with the component section; and an application operation section operable to receive and display the execution result from the application executing section on the mobile terminal, and transmit the operation data to the communication server in response to user operation.

Alternatively, the present invention provides a method for providing mobile service to a plurality of mobile terminals through a communication server which can be accessed from the mobile terminals, the method comprising the following steps:

(1) a step of transmitting operation data to the communication server in response to user operations on the mobile terminals, and performing authentication of the user of each of the mobile terminals by the authentication section connected to the communication server;

(2) a step of accumulating either of a configuration file of an application and a data file to be used by the application, providing the configuration file or the data file to the mobile terminal in accordance with the authentication result from the authentication section, and controlling connection with the component section, this step (2) being performed by a service management section connected to the communication server;

(3) a step of executing the executable file of an application on the basis of operation data from the mobile terminal by an application executing section, and transmitting the execution result from the application executing section to the mobile terminal by a component section, such that the application running on the communication server can remotely be controlled by the mobile terminal;

(4) a step of receiving and displaying the execution result from the application executing section on the mobile terminal.

In accordance with the present invention as described above, since the communication server executes the application and remotely controls configuration files and data files necessary for the execution, it is possible on the management side to control the settings of each mobile terminal distributed to employees from the company for making it possible to use only predetermined software and service. The settings include the authority to run applications, for example, whether to grant permission for the usage in accordance with the position of the user and the department the user belongs to. The resources and licenses of the company can therefore be managed in an integrated fashion.

On the other hand, from the view point of each employee, necessary applications have been already set up and ready for use such that the user can readily proceed with the applications. Also, since the information to be shared in the organization (for example, the telephone directory of employee) can be always updated on the server side, the service provider side can easily change the settings even when there is a change in the shared information and/or compatible devices or the version-upgrade of an application, such that the application can be readily used again without requiring each user to register or update.

Furthermore, in accordance with the present invention as described above, since the communication server can manage the execution histories, settings and data of applications, it is possible to acquire the information about monitoring and aggregating the use of each software and service, and use this information for marketing research or performing charge calculation for each user or each organization.

Still further, in accordance with the present invention, the execution of applications and the display of data can be controlled on the management side, and the data is not stored in the cellular phone itself and therefore prevented from being leaked. Even when the mobile terminal is lost or stolen, the applications and shared data are immediately prohibited from being accessed on the server side, such that there is no fear that any other misuses it.

In the invention as described above, preferably, the process management section controls, for each user, whether to invoke each application and whether to make the icon of each application visible or invisible, display in the application operation section, executable applications as executable icons and applications which cannot be run at the present time but will be executable after performing a setting process as waiting icons, and hide the other applications which are inhibited from being connected.

In this case, with the ions displayed on each mobile terminal, it is possible to display executable applications and applications which cannot be run at the present time but will become executable after performing a setting process such that the user can visually know the state of application service, and need not be confused because the applications, which can not entirely be used, are not displayed. As a result, on the management side, it is easy to provide user support.

In the invention as described above, the service management section performs cooperation with Web services which are dispersedly located in a communication network, stores and holds service authentication information unique to the Web services in a management database in association with the users respectively, acquires service authentication information unique to the each Web service on the basis of the authentication result from the authentication section and, when each of the Web services is accessed, performs an authentication process for the each Web service by the network cooperation section by the use of the service authentication information corresponding to the each Web service.

In this case, once the authentication process is performed from the mobile terminal to the communication server, the procedure of authenticating other Web services can be dispensed with by the use of the authentication information linked to this authentication process. Particularly, in accordance with the present invention, since the communication server manages the application for accessing the Web services, the mobile terminal need not store data for associating the authentication information.

The invention as described above preferably further comprises a step of identifying the position of the mobile terminal by the terminal itself, generating the identified information as positional information, and transmitting the positional information to the communication server, wherein execution of the application by the application executing section is controlled in accordance with the positional information and the authentication result from the authentication section. In this case, it is possible to control whether to run the application in accordance with the location and state of each user by performing user management with reference to the authentication result of the user and the authority to run applications and also in combination with the positional information.

In the invention as described above, preferably, the mobile terminal generates the positional information through contactless communication with a reader writer which performs the authentication of the mobile terminal itself. In this case, it is possible to control whether to run the application in accordance with the authentication relating to the entry into the building and the location of the user in the building, for example, by making use of the mobile terminal as a gate pass such that the security of entrance into a building and the security of data in the building can be centrally managed.

The invention as described above preferably further comprises a step of generating current time information as time slot information, wherein execution of the application by the application executing section is controlled in accordance with the time slot information and the authentication result from the authentication section. In this case, it is possible to change data security and the execution of the necessary applications in accordance with the work content variable depending on the day of a week and the time slot, and adjust the security level in response to time change.

In the invention as described above, preferably, the restriction on each device provided in the mobile terminal and the restriction on the execution of the applications can be imposed in association with each other on the mobile terminal. In this case, by remotely controlling the above applications, the devices associated therewith can be remotely controlled on the mobile terminal side such that the software and hardware of the mobile terminal can be collectively controlled in order to remotely control the functionality of the mobile terminal itself.

In the invention as described above, preferably, when imposing restriction on the connection with the mobile terminal, the service management section performs a charging process in accordance with the amount of data transmitted and received through the connection with the mobile terminal on the basis of the restriction for each user identified in accordance with the authentication result from the authentication section. In this case, the service management section can discriminate between private use and business use by aggregating data used by the users without depending on the communication carrier and the model of the terminal, such that it is possible to separately calculate the charges for private and business use with respect to communication costs, information fees and so forth.

In the invention as described above, preferably, the service management section performs, when providing the data files, determining the type of the user terminal as the accessing terminal, and mutually converting the accumulated data files on the basis of the determination result in order that the accessing terminal can utilize the data files. In this case, the settings of the application and the managing and storing data files are performed in order that the data can be used also by the application running on the mobile terminal even with respect to existing services or the PC terminals and the like connected to a company network by relaying and converting data of the existing services, and thereby the applications running on the mobile terminal and the PC terminal cooperate with each other such that the user who makes use of both the mobile terminal and PC terminal can always continue works in the similar environment irrespective of which terminal is used.

Furthermore, in the invention as described above, preferably, the component section performs: by a process management function, defining a process as a sequence of steps of running functional units of the application which is executed by the application executing section; by a data conversion function, converting data formats or filtering data in order that intermediate data exchanged between the functional units can be processed by the functional unit to be executed next; and by a class providing function, selecting and executing the data conversion function in correspondence with the functional unit to be executed next on the basis of the process defined by a process setting function, and adding a new function to the functional unit or overwriting a function of a functional unit, when executing the functional unit.

In the invention as described above, through the service management section, the component section switches the process of inputting and outputting the same data file in accordance with the identifier of the user authenticated by the authentication section, converts the data on the basis of the process switched in accordance with the identifier of the user, display the data in a data inputting format, and changes the saving format and saving location of the data input through the data inputting format.

In the invention as described above, preferably, the data to be input and output is scheduled data relating to a business plan; the data inputting format is a business report with a field in which a report is input in correspondence with the scheduled data; and the data input through the data inputting format as the business report is converted and stored in a storing format to complete the procedure.

In the invention as described above, preferably, when providing the data files, the component section performs, through the service management section, accessing the data on the Web in accordance with the process, acquiring and converting the data on the Web, displaying the converted data, and changing the saving format and saving location of the data input through the data inputting format.

Effect of Invention

As has been discussed above, in accordance with the present invention, it is possible to easily create an environment in which the management to employees and members thereof, including the installation or the settings of necessary applications, the delivery of other necessary shared data, and supports and maintenance therefor are centralized for example when an organization such as a company has employees and members thereof possess mobile terminals respectively as company communication equipment, and further realize expansive additional service by the use of the mechanism.

BEST MODE FOR CARRYING OUT THE INVENTION

Overall Configuration of The System and Method for Providing Mobile Service

Figure 1:
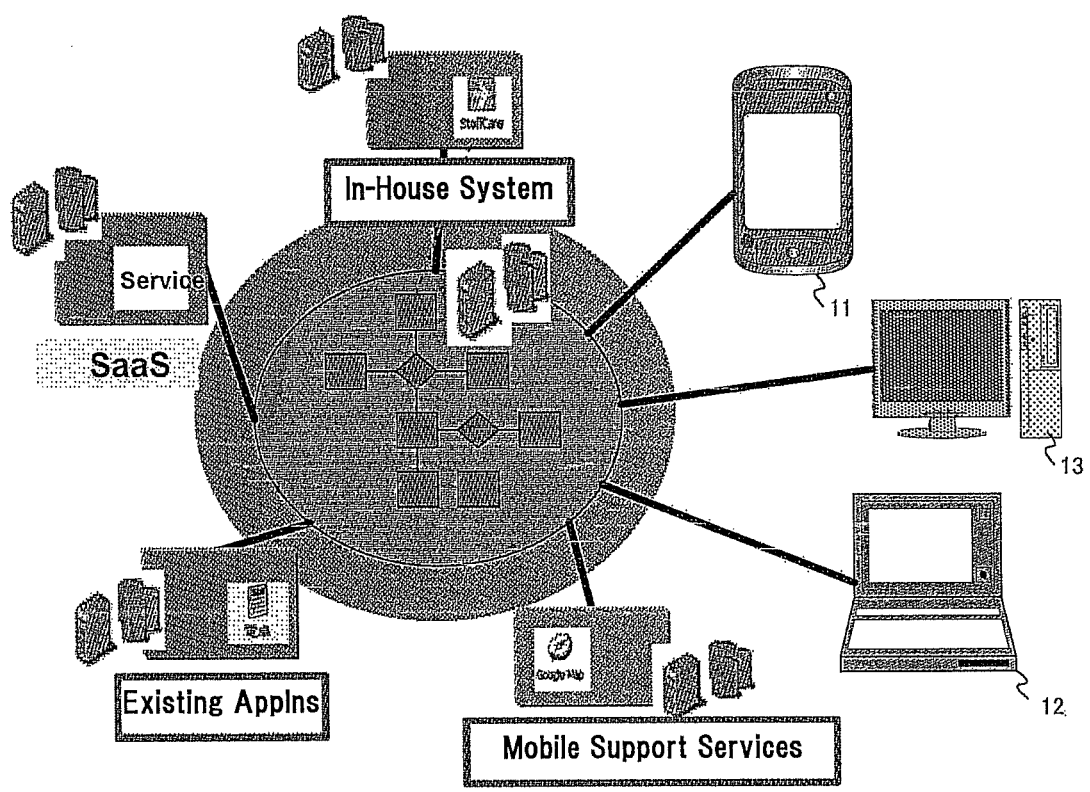
FIG. 1 is a schematic representation showing the overall configuration of the service providing system in accordance with an embodiment.
Figure 2:
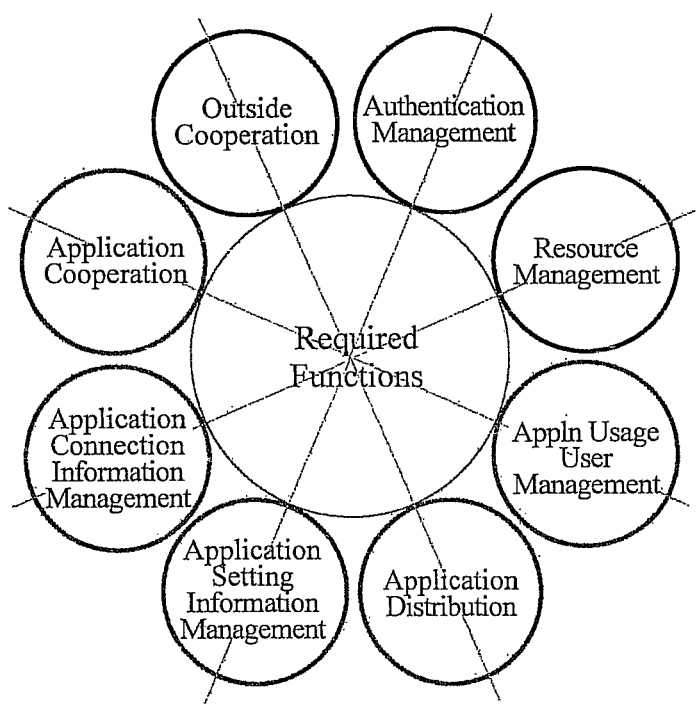
FIG. 2 is a schematic representation showing the functional configuration of the service providing system in accordance with the embodiment.

In what follows, with reference to the accompanying drawings, a system and method for providing mobile service to corporations in accordance with an embodiment of the present invention will be explained in detail. FIG. 1 is a schematic representation showing the overall configuration of the service providing system in accordance with the present embodiment. FIG. 2 is a schematic representation showing the functional configuration of the same system.

As shown in FIG. 1, in accordance with the present embodiment, while an organization such as a company or any other corporation has employees and members thereof possess mobile terminals respectively as company communication equipment, the system for providing mobile service to corporations serves to integrate and centrally manage in-house systems, existing applications, SaaS (software as a service) and mobile support services, which are operating in the company, and these services are provided to the mobile terminals 11 by simplified operation. These integrated services can be implemented by functions as shown in FIG. 2.

Figure 3:
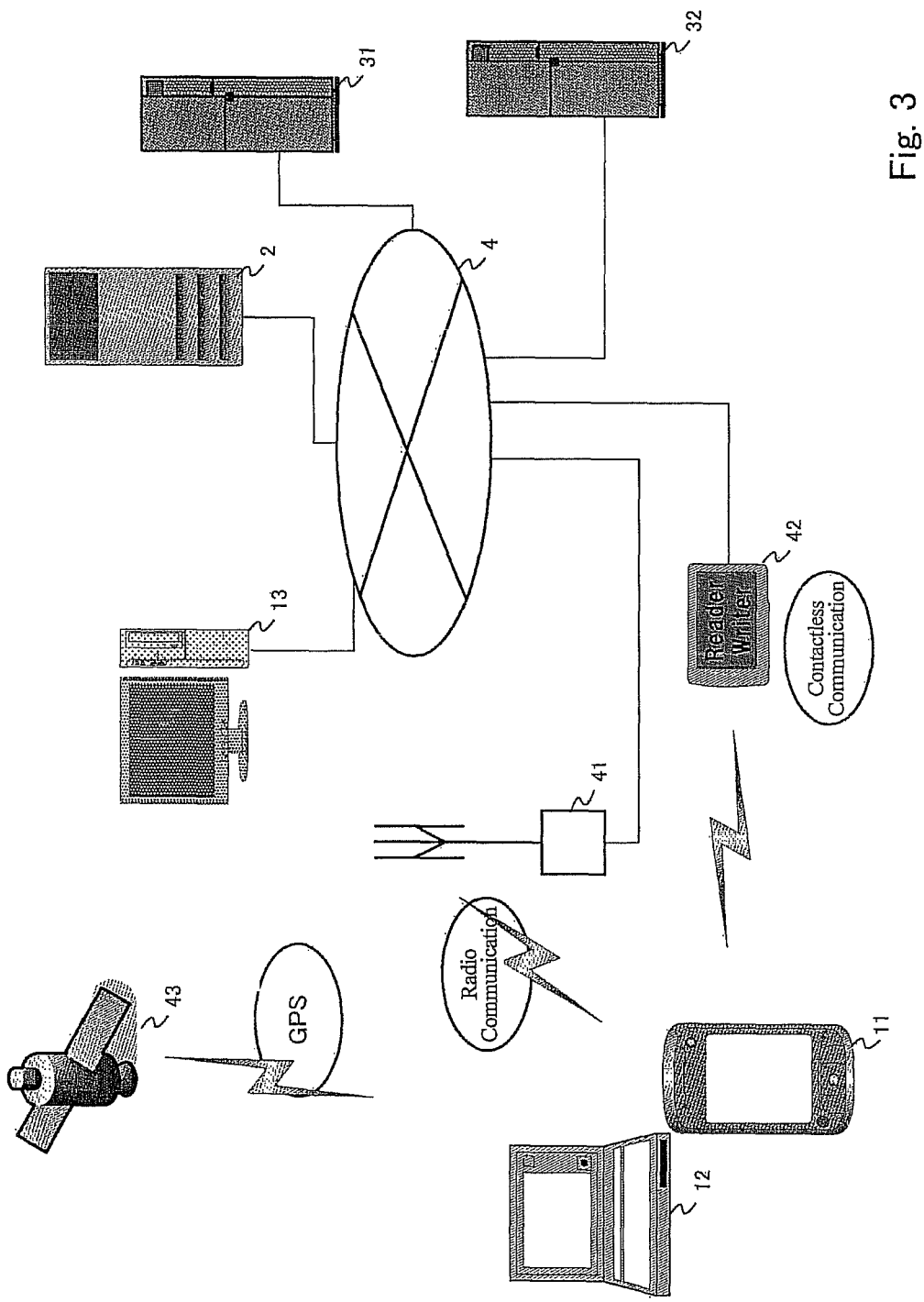
FIG. 3 is a schematic view for showing the overall network configuration of the service providing system in accordance with the embodiment.

FIG. 3 is a view for schematically showing the overall network configuration of the service providing system in accordance with the present embodiment. In the same figure, the terminals used by the users may be the mobile terminal 11, a mobile PC 12 or a conventional desktop PC 13, which can be connected to a communication network 4 through wireless or wired communication.

In this case, the communication network 4 is a distributed IP communication network which is constructed by connecting a variety of communication lines (telephone line, ISDN line, public network such as ADSL line, dedicated communication line, and radio communication network) to each other by the use of the communication protocol TCP/IP. This IP network includes, besides the Internet, a LAN such as a home network, an intranet (a network within a company) based on 10BASE-T, 100BASE-TX or the like.

The mobile terminal 11 is a mobile telephone having a main function of performing wireless telephone conversation through a base station 41, and also serves as a smart phone in which a variety of applications can be run on an OS. This mobile telephone is provided with, for example, the functions of measuring the degrees of latitude and longitude where the telephone itself is located by means of GPS using signals received from a satellite 43 or the like, and performing an authentication process and a settlement process with an external reader writer 42 through contactless communication such as RFID.

Also, on the communication network 4, there are a management server 2 for providing this system, a customer server 31 for providing an existing in-house system, and an external server 32 dispersedly located in the Internet for providing a variety of Web services, such that these servers can be accessed.

These servers are implemented with a server computer or software capable of performing the functionality of the server computer for performing information transmission of HTML (HyperText Markup Language) files, image files, music files and the like in a document system such as WWW (World Wide Web), and serves to accumulate information such as HTML files and images, and transmit the information in response to requests from client software such as Web browsers through the communication network 4 such as the Internet.

Figure 4:
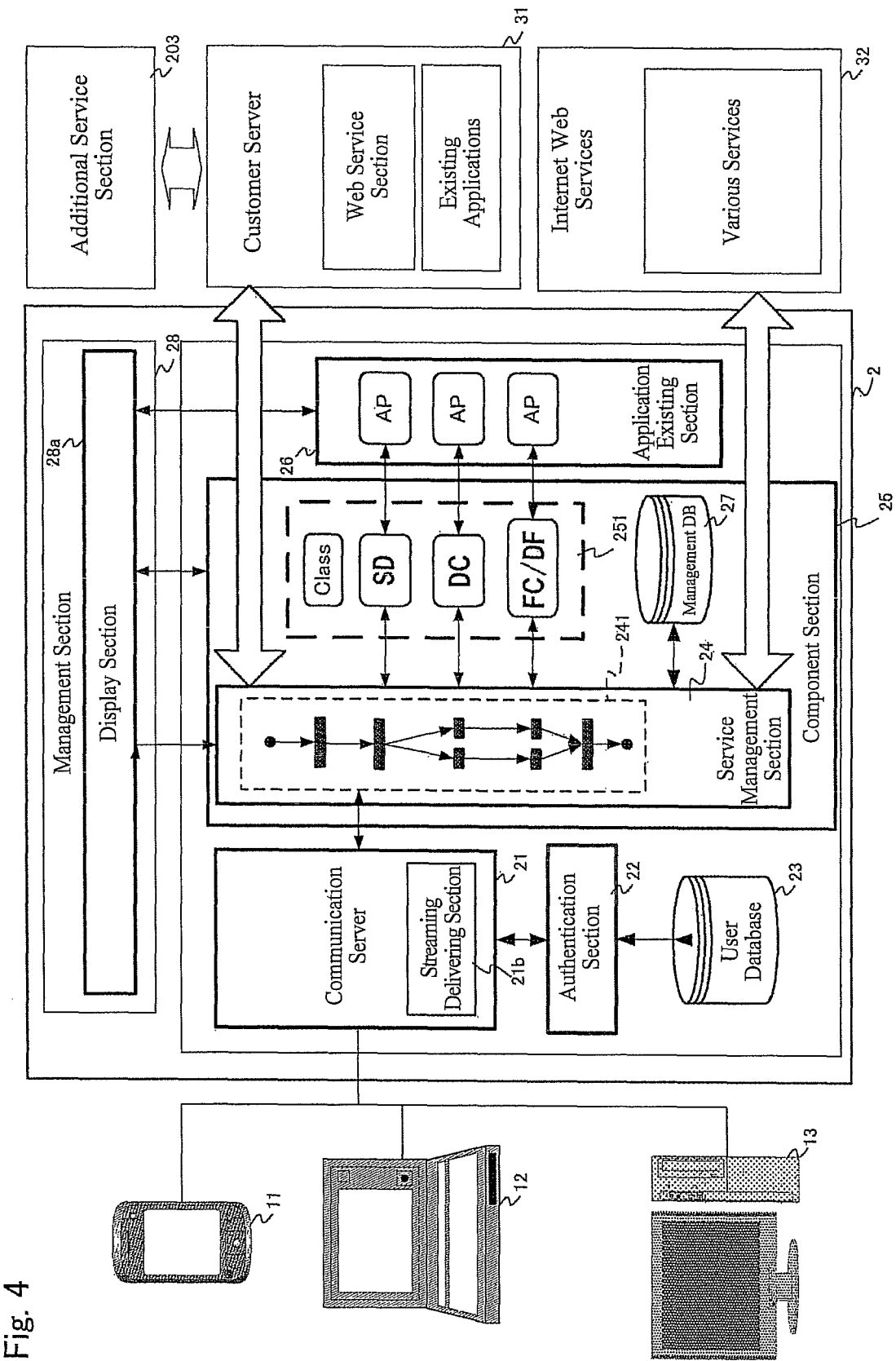
FIG. 4 is a block diagram for showing the internal configuration of the management server 2 in accordance with the embodiment in relation to the other servers.

FIG. 4 is a block diagram for showing the internal configuration of the management server 2 in relation to the other servers. Incidentally, the term "module" used in this explanation is intended to encompass any functional unit capable of performing predetermined operations, as implemented with hardware such as a device or an apparatus, software capable of performing the functionality of the hardware, or any combination thereof.

As shown in the same figure, first, the management server 2 is provided with a communication server 21 for transmitting and receiving data to and from other devices and equipment through the communication network 4 and other communication lines, and an authentication section for authenticating users who access the system through this communication server 21. Meanwhile, in the case of the present embodiment, each of the management server 2 and other servers is illustrated as a single server device. However, the present invention is not limited thereto, but each server can be implemented as a server group consisting of a plurality of devices to which functions are distributed.

The communication server 21 is capable of communicating with the external reader writer 42 and the like which are connected through an IP network as a Web server, a dedicated communication line or the like. Particularly, this communication server is provided with a streaming delivering section 21b for streaming delivering motion pictures and various data, which can be output and displayed, such as still images, graphics, text information and the like all in the form of motion picture files.

Also, the authentication section 22 is implemented with a computer or software capable of verifying the authority of the accessing user, and confirms whether or not the accessing user is authorized, whether or not the accessing person is identified as the user and so forth, by acquiring the combination of a user name and a password from the accessing person and searching the user database 23. It is possible to identify the user and provide different services for different user respectively by confirming the accessing person on the basis of the authentication process.

The user database 23 is a database apparatus for storing the authentication information and personal information of each user, and used to identify the user by using the information linked to the user ID and save the data necessary for each user.

Also, the management server 2 is provided with, as a module for performing application management, a service management section 24, a component section 25, a management database 27, and an application executing section 26.

The application executing section 26 is a module for running part or all of the executable file of each application, and saves and runs the executable file of the application on the management server 2 in order to lessen the burden on the client side and make it possible on the management server 2 side to control whether to run the application. Incidentally, the process of "running part or all of the executable file of each application by the application executing section 26", generally referred here, includes the process of downloading the executable file on the mobile terminal side, and invoking and running the executable file on the mobile terminal side as long as the management server 2 stores resources and data, which are indispensable for completely running the application, such as program elements (classes and modules) as part of the program, configuration files and so forth such that it is indispensable for running the application to access the application executing section 26.

The component section 25 is a module for providing a function (method) of running the applications in a suitable manner for each mobile terminal, and connecting the application operation section 11b of the mobile terminal and the application executing section 26. More specifically speaking, the component 25 calls methods in accordance with operation data input through the mobile terminal 11, runs the application by the application executing section 26, and transmits the execution results thereof to the mobile terminal 11 on which the execution results are operably displayed. By this configuration, it is possible to remotely control the application that is running on the management server 2 from the mobile terminal 11. The component section 25 imposes restrictions on the execution and functions of the applications for each user by controlling execution of the methods.

Figure 11:
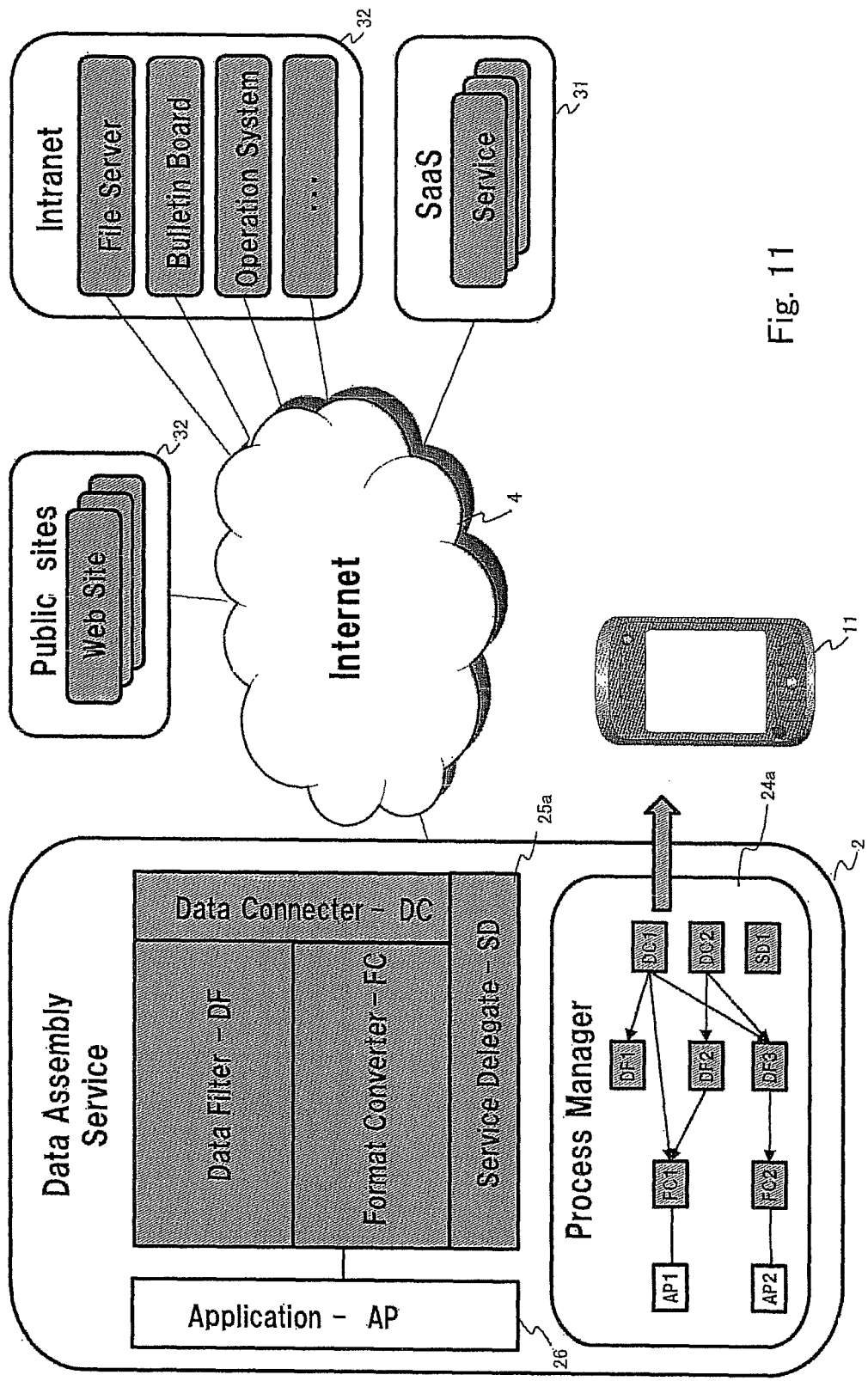
FIG. 11 is an explanatory view for showing the outline of the data assembly service of the service providing system in accordance with the embodiment.
Figure 12:
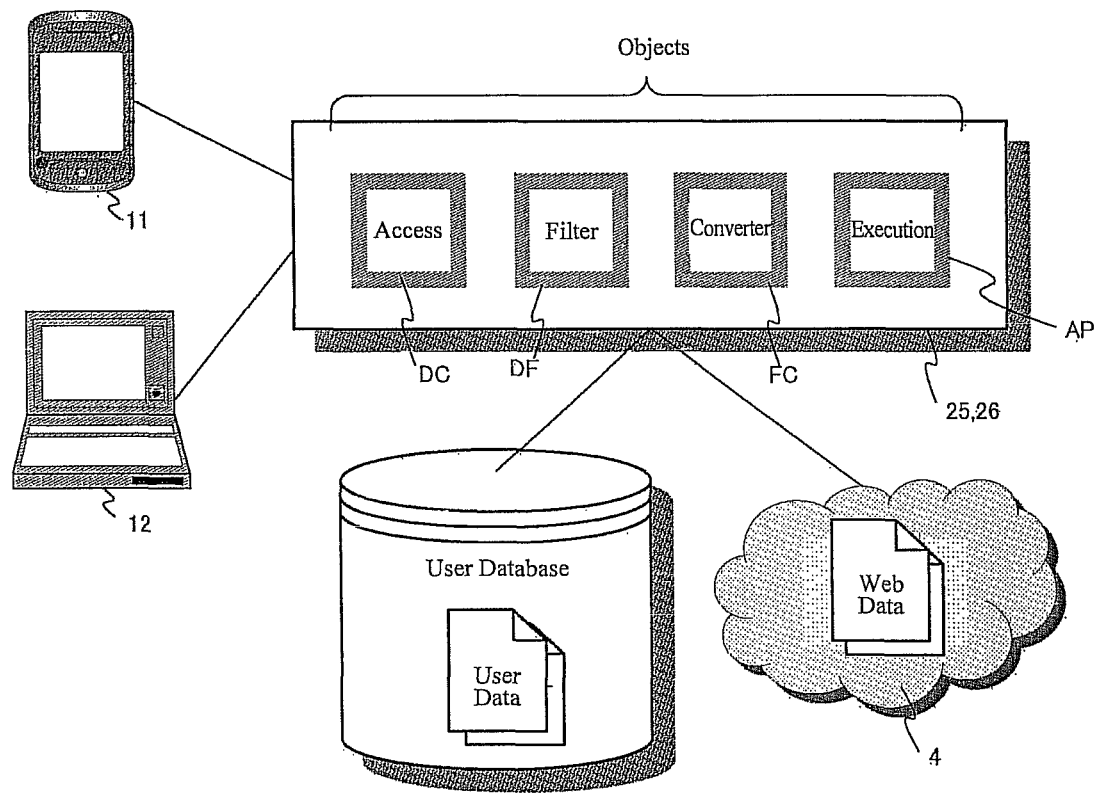
FIG. 12 is an explanatory view for showing the outline of the objects of the service providing system in accordance with the embodiment.

More specifically describing the component section 25, as illustrated in FIG. 11 and FIG. 12, this component section 25 is a main module for providing data assembly service, and includes a data assembly section 251 which provides a process management function for performing process management (Process Manager), a data converting function FC/DF and a class providing function (Class). Incidentally, in the case of the present embodiment, the process management function is provided by a process management section 241 of the service management section 24. The process management section 241 is a module for defining a process as a sequence of steps of running functional units AP of the applications which are executed by the application executing section 26.

The data assembly section 251 is a module for storing a number of objects which are defined by associating data itself with methods as the ways of processing the data, and executing the objects. The objects include functional units AP, methods, data and properties with which intermediate data exchanged between the functional units AP can be processed by a functional unit AP to be executed next. Specifically, the objects include a file converter FC for converting data formats, a data filter DF for filtering data, a data connector DC for accessing a database, data files and so forth, a service delegate SD for providing these services by proxy.

Furthermore, this data assembly section 251 is provided with a class library as a class providing section. In this case, a class is defined as a prototype of object by encapsulating data and methods, and a class library is a group of classes. Particularly, the data assembly section 251 selects and executes an object (data access, data conversion function and so on) in correspondence with the functional unit AP to be executed on the basis of the process defined by a process setting function. The system is constructed such that, when executing each object (including the functional unit AP), it is possible to add a new function (definition), or inherit a definition of another class by adding the function to the object and the functional unit AP or overwriting a function of the functional unit AP.

The service management section 24 is a system interface for providing services to each mobile terminal through the communication server 21 and provides, for example, windows, icons and other GUI to be displayed in the display screen of the mobile terminal 11 to the mobile terminal and converter and adapter functions to perform, for example, data conversion for using the service provided by the external customer server 31 in the present system.

Also, the service management section 24 is a module for changing the services to be provided for the mobile terminals respectively and centrally managing these services, and serves to timely read a configuration file or data file of each application stored in the management database 27 corresponding to each user in accordance with the authentication result of the authentication section 22, provide the mobile terminal with the file, and control the connection with the component section 25.

The service management section 24 performs the management of the application running process by controlling whether to run each application for each user (whether there is an installation history or not) and whether to make the icon of the application visible or invisible, in order to display in the application operation section 11b executable applications (which have been installed) as executable icons and applications which cannot be run at the present time but will be executable after performing a setting process as waiting icons, and hide the other applications which are inhibited from being connected.

This management of the application running process performed by the service management section 24 includes the operation of defining a process which is a sequence of steps of running the functional units AP of the applications to be run, as performed by the process management section 241. Namely, the icon for running the application can be assigned to the object which is defined by associating data itself and methods as the functional unit AP, and can be assigned further to the class itself which is the definition of the object by encapsulating data and methods.

Then, the user or administrator can define the aforementioned process and register the process itself as an icon by arbitrarily selecting and rearranging the icons assigned to the objects, the classes or the functional units of the applications, and performing most basic settings thereof.

Furthermore, this management of the application running process performed by the service management section 24 includes the operation of managing installation of the applications for each user. When the user exchanges the terminal with new one or adds a new function, the installation management is performed to control, on the server 2 side, which application is made executable in order to make it possible to install only applications which are purchased or contracted, remotely control the terminal in order to automatically proceed with necessary preparation of installation and the operation procedure, and provide assistance such as guidance in operation for the user.

Incidentally, the files downloaded on the terminal side during installing are not necessarily provided from the server 2, but for example may be an application which is provided by a third party and designated by the server 2, e.g., through an URL to indicate downloading. While the third party actually distributes the application, the server 2 performs management only by monitoring whether or not the files have been successfully downloaded.

Also, the usage environments of users vary in the models of the terminals used by the users, the types and versions of OS, the installed applications and drivers and so forth such that, when an application is added or updated, the configuration and installation procedure of programs to be installed have to be adjusted compatible with the usage environments of each user, and thereby the service management section 24 saves the usage environment in the user database 23 for each user, and makes use of the data of the usage environment for selecting the procedure of installation and the files to be used.

Incidentally, the applications as installed in this manner include so-called "hidden programs" whose execution and existence are unnoticed even when the applications are invoked and run. When the above application is installed, it is determined whether to install the hidden programs in accordance with the usage environment. With respect to the visible and invisible properties of the icons as described above, the hidden programs are treated as exceptions. Namely, the programs are invisible even though executable, and not displayed even as waiting icons even if awaiting installation. Examples of the hidden programs includes drivers and libraries which are not available in the OS, data such as runtime files, codec programs and plug-in software for video playback software, patch files which are differential data provided for each version, and so forth.

On the other hand, the adapter functions of this service management section 24 determines the type of the accessing terminal such as the mobile terminal 11 or the PC12 and the type and version of the OS running on the terminal, and performs the conversion process to the data format suitable for the terminal. The data to be converted includes, for example, the data delivered by additional services 203 and the external server 31 or 32, and also includes the files created by the same user, such that the user can continue the work using the same data with any device of the mobile terminal 11, the PC 12 and the like which the user uses by interconversion among file formats in accordance with the usage environment.

Furthermore, the adapter functions of the service management section 24 includes, as the above conversion of data formats, the process of converting various data, which can be displayed, such as still images, graphics, text information and the like all into streaming data in a unified way. The streaming data is delivered as motion pictures (or still images) to the terminal 11, and the streaming data as delivered can be displayed by a usual media playback software. By this configuration, it is possible to handle and display, as unified streaming data, various data, which can be output and displayed, such as still images, graphics, text information and the like on a projector or monitor connected to the terminal 11, and have other persons view the data even in an environment where the application corresponding to the data cannot be invoked and run such that presentation can be easily performed away from the office.

The management database 27 is a database device for accumulating the configuration files of applications, the data files which are used by the applications, and storing the service authentication information unique to Web services in association with the users respectively.

Then, the service management section 24 acquires the service authentication information unique to Web services on the basis of the authentication result from the authentication section, and the network cooperation section performs the authentication process for each Web service by the use of the service authentication information corresponding to this Web service when this Web service is accessed.

Meanwhile, the service management section 24, the component section 25, the application executing section 26 are connected to a management section 28 and can be monitored and controlled by the administrator through the display section 28a of the management section 28.

Figure 5:
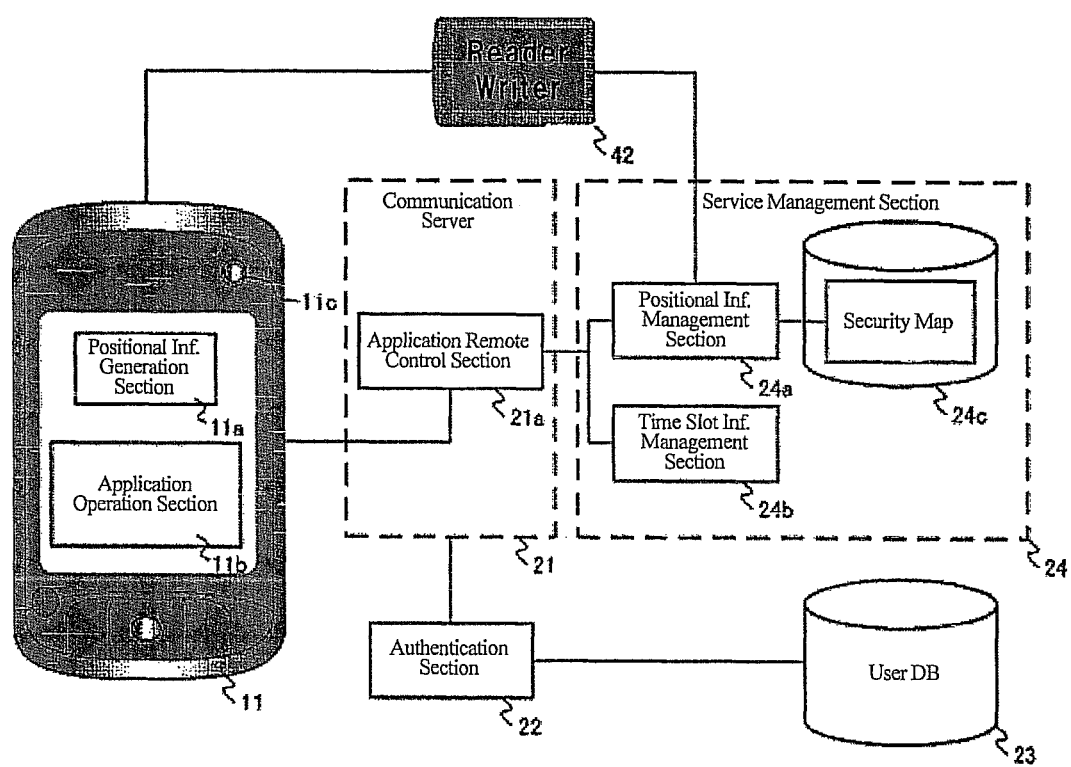
FIG. 5 is a functional block diagram for showing modules of the mobile terminal and the communication server which are used to manage execution of applications in accordance with the embodiment.

FIG. 5 is a functional block diagram for showing modules of the mobile terminal 11 and the management server 2 which are used to manage execution of applications.

The mobile terminal 11 receives the execution result of the application executing section 26, and displays the result on the display section such as the liquid crystal display, and provided with the application operation section which transmits operation data to the management server 2 in response to the user operation. The application in the management server 2 can therefore be remotely invoked and controlled by the user through key operation and touch panel operation.

On the other hand, this application operation section 11b has the function of restricting operation of each device provided in the own terminal such that the operation of each device can be controlled in cooperation with the restriction on the application execution. In this case, the applications include the drivers running on the OS of the mobile terminal 11. The operation of each device provided in the mobile terminal 11 can be remotely controlled on the management server 2 side by restricting the execution of the driver software. For example, by controlling the execution of the driver software for a digital camera 11c, a liquid crystal display, a conversation capability (inclusive of a microphone and a speaker), a vibration function, a power supply function provided in the mobile terminal 11, it is possible to control the operations of these devices.

Furthermore, the mobile terminal 11 is provided with a positional information generation section 11a which identifies the position of the terminal itself, generates the identified information as positional information, and transmits the positional information to the management server 2. In the case of the present embodiment, the positional information generation section 11a has the function of generating the positional information in response to the contactless communication with the reader writer 42 which performs the authentication of the mobile terminal.

On the other hand, the service management section 24 is provided with a positional information management section 24a which controls execution of the application by the application executing section 26 in accordance with the positional information of each mobile terminal and the authentication result of the authentication section 22, and a time slot information management section 24b which generates current time information as time slot information and controls execution of the application by the application executing section 26 in accordance with the time slot information and the authentication result from the authentication section 22. These authentication section 22, the positional information management section 24a and the time slot information management section 24b refer to the access permission of a user by identifying the user in the authentication section 22, and control the application in accordance with the access permission through an application remote control section 21a.

When controlling the application, the positional information management section 24a refers to a security map 24c, and determines the application and device to be controlled in accordance with the position of the mobile terminal (user). More specifically speaking, if the user performs the authentication through contactless communication with the reader writer 42, the positional information management section 24a acquires the positional information of the mobile terminal from the reader writer 42 while the authentication process is performed by when the authentication section 22. The reader writer 42 is installed in the location of a building provided with a security lock system or the like, which is unlocked through an authentication process performed by holding the mobile terminal over the reader writer 42 to exchange authentication information.

Then, the user is identified as the owner of the mobile terminal by the authentication result of the authentication section 22 to refer to the access permission, and the applications and devices executable in the area are changed on the basis of the access permission corresponding to the authority given to the user (administrator, standard user or the like), the positional information of the user (the position of the security lock) and the current time.

(Method for Providing Mobile Service)

The method for providing mobile service in accordance with the present invention can be implemented by operating the system for providing mobile service having the structure as described above. In the case of the present embodiment, the mobile service is based on the data assembly service as shown in FIG. 11.

This data assembly service is provided by the above component section 25 as process control (Process Manager) in the process management section 241 and data construction (Data Assembly) in the data assembly section 251.

The process management section 241 defines a process as a sequence of steps of running functional units AP of the applications which are executed by the application executing section 26.

The data assembly section 251 includes, for example, the file converter FC for converting data formats in accordance with the process defined by the process management section 241, the data filter DF for filtering data, the data connector DC for accessing the database, data files and so forth, the service delegate SD for providing these services by proxy, and performs the process such that intermediate data exchanged between the functional units AP can be processed by the functional unit AP to be executed next. Also, this data assembly section 251 is provided with the class library as the class providing section such that, when executing each object (including the functional unit AP), it is possible to add a new function (definition), or inherit a definition of another class by adding the function to the object and the functional unit AP or overwriting a function of the functional unit AP.

By this configuration, as illustrated in FIG. 11 and FIG. 12 for example, the user can easily use the mobile terminal 11 for accessing the servers 31 and 32 which are dispersedly located in the Internet 4, acquiring Web data from public sites, sharing user data through the Internet 4, utilizing SaaS (Software as a Service) which provides application functions through the Internet 4 and the like processes.

Figure 13:
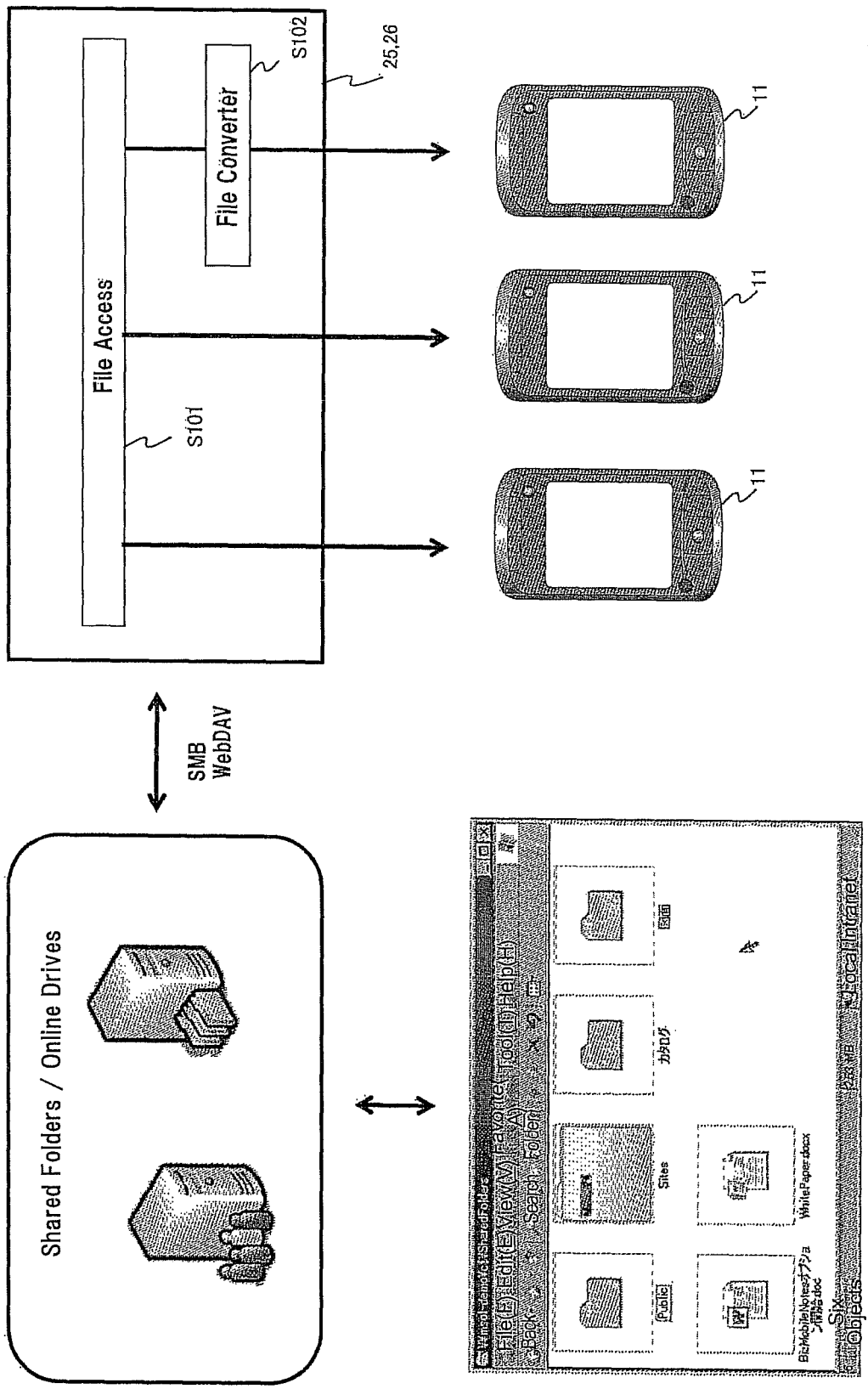
FIG. 13 is an explanatory view for showing the outline of the file sharing service of the service providing system in accordance with the embodiment.
Figure 14:
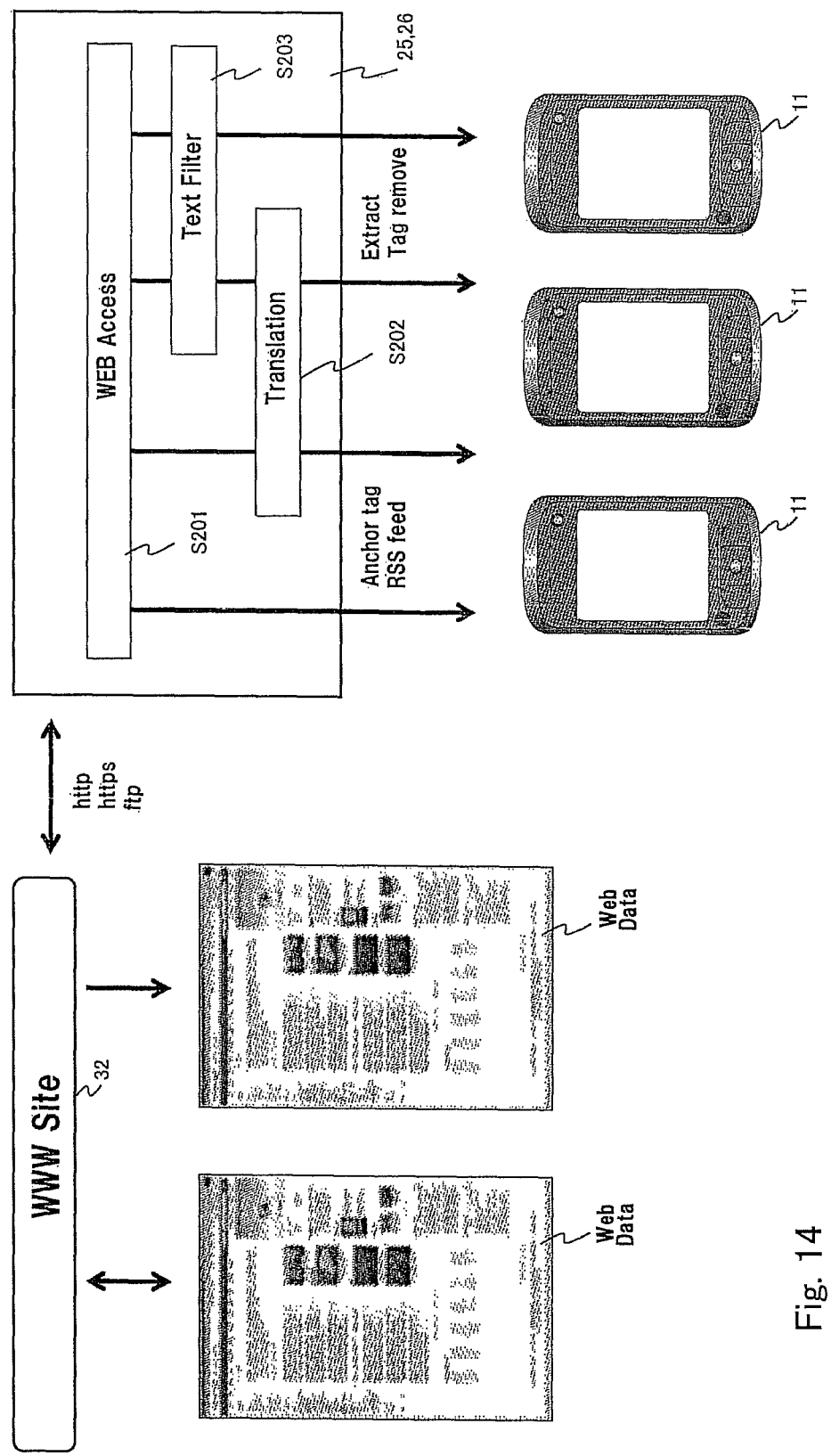
FIG. 14 is an explanatory view for showing the outline of the news viewing service of the service providing system in accordance with the embodiment.

For example, when sharing data and connecting with online drives as described above, data is transmitted to the mobile terminal 11 by accessing folders and drives on a network through the data connector DC for accessing a database and data files (S101), and converting the data by the file converter FC (S102) if necessary, as illustrated in FIG. 13. On the other hand, for example, when acquiring Web data from Web sites as illustrated in FIG. 14, data is transmitted to the mobile terminal 11 by accessing a Web site (the server 32) through the data connector DC (S201) after performing, if necessary, language translation by the file converter FC (S202) and removal of unnecessary tag data, image data and/or the like by the data filter DF (S203).

FIGS. 6 through 10 are explanatory views for schematically showing the operation of the system for providing mobile service in accordance with the present embodiment implemented with the data assembly service as described above.

Application Distribution and Configuration Information Management

Figure 6:
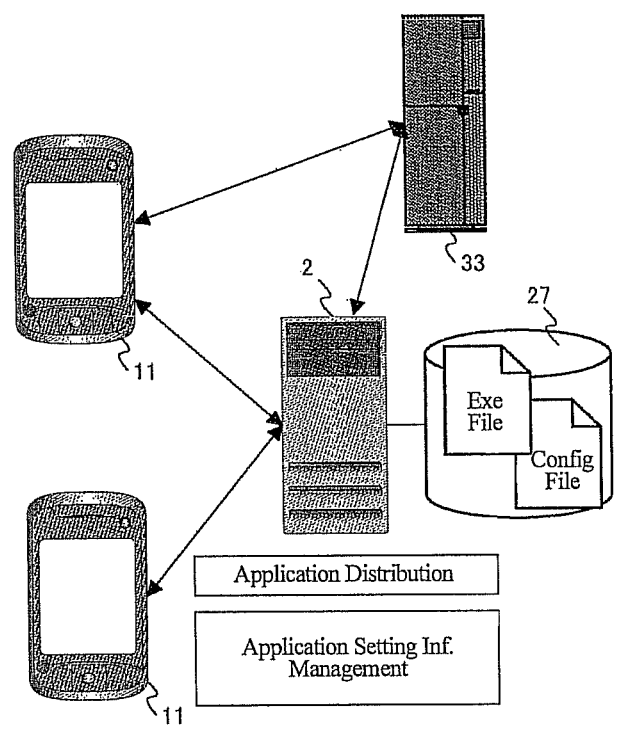
FIG. 6 is an explanatory view for showing the operation of distribution of applications and configuration information management of the service providing system in accordance with the embodiment.

As shown in FIG. 6, distribution of applications is performed through the management server 2. More specifically speaking, the application running on the management server 2 can be remotely controlled from the mobile terminals 11 by running the application in the application executing section and transmitting the execution results thereof to the mobile terminals 11 on the basis of user operation data from the mobile terminals 11. This means that the application is distributed to each of the mobile terminals 11.

Meanwhile, the process management section 24 controls, for each user, whether to invoke each application and whether to make the icon of each application visible or invisible, display, on the mobile terminal 11 side, executable applications as executable icons and applications which cannot be run at the present time but will be executable after performing a setting process as waiting icons, and hide the other applications which are inhibited from being connected. By this configuration, the user can visually know the state of application service, and need not be confused because the applications, which can not entirely be used, are not displayed. As a result, on the management side, it is easy to provide user support.

On the other hand, the service management section 24 of the management server 2 accumulates, for each mobile terminal, the configuration files of the applications and data files used by the applications in the management database 27, and provides files selected from among the configuration files and data files to the mobile terminal in accordance with the authentication result from the authentication section 22. The configuration files and data files include scopes which can be freely set up and scopes which can be changed on the management server 2 side. The management server 2 remotely controls the settings for each user or each group (organization), and thereby it is possible on the management side to control the settings of each mobile terminal distributed to employees from the company for making it possible to use only predetermined software and service. The settings include the authority to run applications, for example, whether to grant permission for the usage in accordance with the position of the user and the department the user belongs to.

On the other hand, from the view point of each user (employee), necessary applications have been already set up and ready for use such that the user can readily proceed with the applications. Also, since the information to be shared in the organization (for example, the telephone directory of employee) can be always updated on the server side, the service provider side can easily change the settings even when there is a change in the shared information and/or compatible devices or the version-upgrade of an application, such that the application can be readily used again without requiring each user to register or update.

Furthermore, in the case where an application runs partly in the terminal, necessary files are distributed (installed and upgraded) with respect to this part. In this case, there is a process managed for each user. When the user changes the terminal to new one or adds (upgrades) the functions thereof, this management is performed by performing the process of controlling applications to be executable on the server 2 side in order to install only the applications which are purchased or licensed for the company (organization) in advance, the process of remotely manipulating the terminal in order to automatically proceed with necessary installation preparation and operation procedure, and the process of providing operation assistance such as guidance for the user.

Also, the usage environments of users vary in the models of the terminals used by the users, the types and versions of OS, the installed applications and drivers and so forth such that, when an application is added or updated, the configuration and installation procedure of programs to be installed have to be adjusted compatible with the usage environments of each user, and thereby the service management section 24 saves the usage environment in the user database 23 for each user, and makes use of the data of the usage environment for selecting the procedure of installation and the files to be used.

Incidentally, when the above application is installed, it is determined whether to install the hidden programs in accordance with the usage environment. With respect to the visible and invisible properties of the icons as described above, the hidden programs are treated as exceptions. Namely, the programs are invisible even though executable, and not displayed even as waiting icons even if awaiting installation.

Incidentally, the files downloaded on the terminal side during installing are not necessarily provided from the server 2, but for example may be an application which is provided by the server 33 of a third party and designated by the server 2, e.g., through an URL to indicate downloading. While the third party actually distributes the application, the server 2 performs management only by monitoring whether or not the files have been successfully downloaded.

Common Data Conversion and Cooperation of Applications

Figure 7:
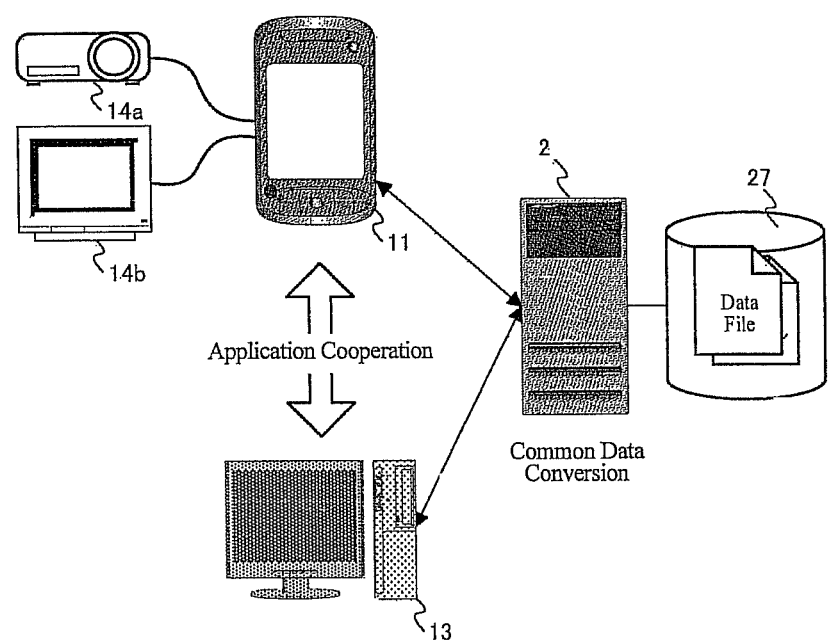
FIG. 7 is an explanatory view for showing the operation of common data conversion and cooperation of applications of the service providing system in accordance with the embodiment.

As shown in FIG. 7, when data files are provided from the management server 2, the data files accumulated in the management database 27 are mutually converted, in order that the user terminal as the accessing terminal can utilize the data files, on the basis of the result of determining the type (the mobile terminal 11, the PC terminal 13 or the like) of the accessing terminal.

More specifically, the adapter functions of the service management section 24 determines the type of the accessing terminal such as the mobile terminal 11 or the PC12 and the type and version of the OS running on the terminal, and performs the data conversion process to the data format suitable for the terminal. The data to be converted includes the files created by the same user, such that the user can continue the work using the same data with any device of the mobile terminal 11, the PC 12 and the like which the user uses by interconversion among file formats in accordance with the usage environment.

By this configuration, even if the data files are transferred from existing services or the PC terminals 13 and the like connected to a company network, these data files are converted for sharing and relayed in order to be used by an application running on the mobile terminal 11, and thereby the applications running on the mobile terminal 11 and the PC terminal 13 cooperate with each other such that works can be continued always in the similar environment irrespective of which terminal is used.

Furthermore, the above common data conversion includes, as the above data format conversion, the process of converting various data, which can be displayed, such as still images, graphics, text information and the like all into streaming data in a unified way by the adapter functions of this service management section 24. The streaming data is delivered as motion pictures (or still images) to the terminal 11, and the streaming data as delivered can be displayed by a usual media playback software. By this configuration, it is possible to handle and display, as unified streaming data, various data, which can be output and displayed, such as still images, graphics, text information and the like on a projector 14*a* or monitor 14*b* connected to the terminal 11, and have other persons view the data even in an environment where the application corresponding to the data cannot be invoked and run such that presentation can be easily performed away from the office.

Outside Cooperation

Figure 8:
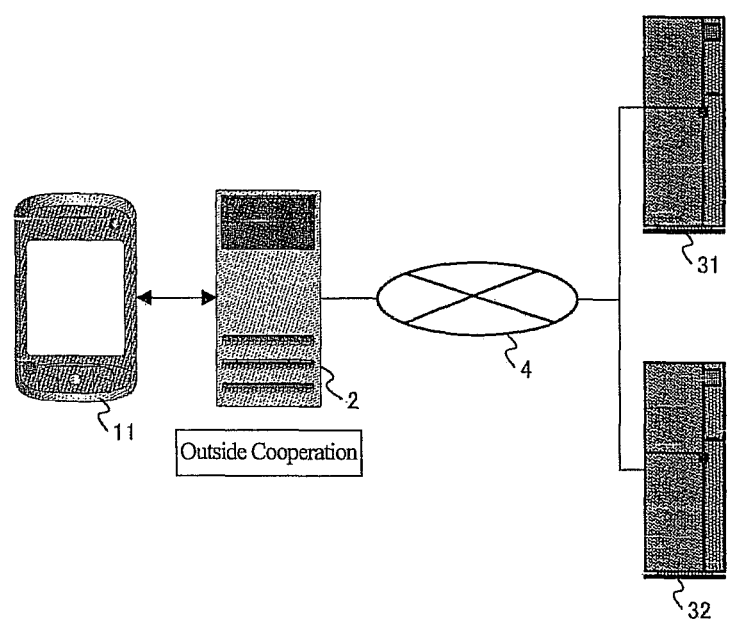
FIG. 8 is an explanatory view for showing the operation of outside cooperation of the service providing system in accordance with the embodiment.

As shown in FIG. 8, the management server 2 is designed to cooperate with the existing services in a company network, or external Internet Web services. More specifically speaking, the management server 2 is connected to the customer server 31 in a company system or the external server 32, and can exchange data with applications and services running on these servers. In this case, data connection is performed by determining the type of the various server 31 or 32 to be accessed, selecting a data conversion template in accordance with the determination result, mutually converting the data structure in accordance with this template, and calling necessary functions (classes and modules). By this configuration, it is possible to use the mobile terminal in the same manner as a single interface also with the existing services inside and outside the company which have been used by the company.

Specifically, the adapter functions of this service management section 24 determines the type of the accessing terminal such as the mobile terminal 11 or the PC12 and the type and version of the OS running on the terminal, and performs the data conversion process to the data format suitable for the terminal. The data to be converted includes, for example, the data delivered by additional services 203 and the external server 31 or 32, and even if the data is in the data format provided for use in an application running on a PC, the user can continue the work with the same data through any terminal by converting the data into file formats compatible with the usage environment of the mobile terminal 11.

Authentication Management

Figure 9:
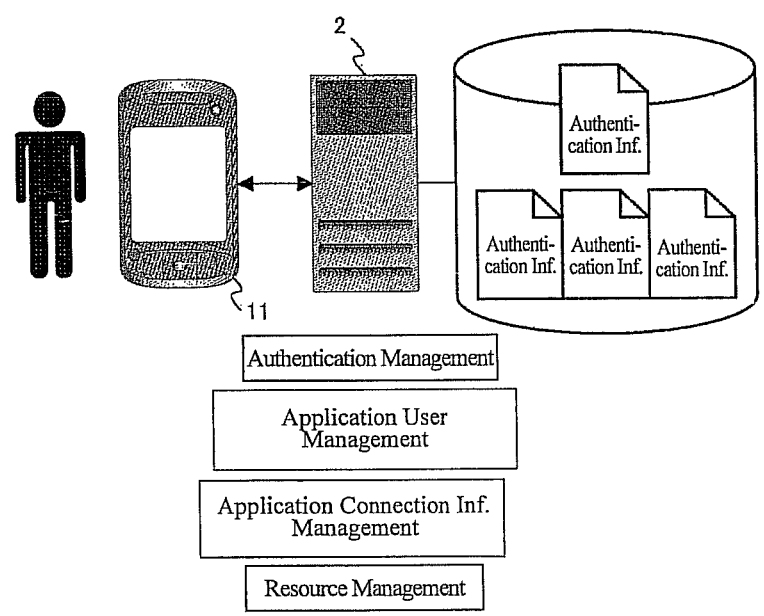
FIG. 9 is an explanatory view for showing the operation of authentication management of the service providing system in accordance with the embodiment.

As has been discussed above, in the case of the present embodiment, when an application is invoked by the mobile terminal 11, part or all of the application runs on the management server 2 side so that it is required for running the application to access the management server 2 and perform authentication process. By this configuration, as illustrated in FIG. 9, a variety of management processes can be performed in an integrated fashion on the basis of authentication management by the management server 2.

For example, the settings can be controlled on the management side in order to permit the use of only predetermined software or service, i.e., set the authority to run applications or control connection admission to the service, by managing the application users, e.g., identifying the user and referring to the organizational position on the basis of authentication process. The resources and licenses of the company can therefore be managed in an integrated fashion. In addition to this, the execution of applications and the display of data can be controlled on the management side, and the data is not stored in the cellular phone itself and therefore prevented from being leaked. Even when the mobile terminal is lost or stolen, the applications and shared data are immediately prohibited from being accessed on the server side, such that there is no fear that any other misuses it.

Furthermore, the above time slot information management is used to manage the users and applications, for example, by switching the available applications in accordance with whether or not it is within business hours, and thereby it is possible to meet both the need in the organization for business activity and the need of individual users during off-hours. For example, the user is prohibited from accessing external services within business hour, but permitted to access game sites, travel site and so forth during off-hours, such that it is possible to increase opportunities for using the mobile terminal, privately or on business. Still further, in accordance with the mobile terminal as described above, since the management server 2 can manage the execution histories, settings and data of applications, it is possible to acquire the information about monitoring and aggregating the use of each software and service, and use this information for marketing research or performing charge calculation for each user or each organization.

In particular, when imposing restriction on the connection with the mobile terminal 11, the service management section 24 performs a charging process in accordance with the amount of data transmitted and received through the connection with the mobile terminal 11 on the basis of the restriction for each user identified in accordance with the authentication result from the authentication section 22. By this configuration, the service management section 24 can discriminate between private use and business use by aggregating data used by the accessing users without depending on the communication carrier and the model of the terminal, such that it is possible to separately calculate the charges for private and business use with respect to communication costs, information fees and so forth.

In this case, the service management section 24 provides a designated site charging function of aggregating the amount of data transmitted to the mobile terminal 11 from (intra) sites designated by the company, and also provides a designated site restricting function of restricting the access to sites by displaying and/or undisplaying site access icons which are available, a designated site distributing function of distributing site access icons designated by the company to the registered terminals, and a packet analyzing function of analyzing the histories of accessing the (intra) sites designated by the company for each terminal in a time series.

Also, the authentication management is performed in cooperation with the Web services of the servers 31 and 32 by storing and holding the service authentication information unique to each Web service in the management database 27 in association with each user, and acquiring the service authentication information unique to each Web service on the basis of the authentication result from the authentication section 22. The network cooperation section performs the authentication process for each Web service by the use of the service authentication information corresponding to this Web service when this Web service is accessed.

By this configuration, once the authentication process is performed from the mobile terminal 11 to the communication server, the procedure of authenticating other Web services can be dispensed with by the use of the authentication information linked to this authentication process. Particularly, since the management server 2 manages the application for accessing the Web services, the mobile terminal need not store data for associating the authentication information.

Furthermore, as described above, the mobile terminal 11 identifies the position of the terminal itself and generates the identified information as positional information, and the management server 2 manages the position of the user. In accordance with the authentication management of the present embodiment, the positional information management section 24*a* and the time slot information management section 24*b* refer to the access permission of a user by identifying the user in the authentication section 22, and control the applications in accordance with the access permission through an application remote control section 21*a*.

When controlling the applications in this manner, the application and device to be controlled are determined by referring to the security map 24*c* in accordance with the position of the mobile terminal (user). More specifically speaking, if the user performs the authentication through contactless communication with the reader writer 42, the positional information management section 24*a* acquires the positional information of the mobile terminal from the reader writer 42 while the authentication process is performed by when the authentication section 22. The reader writer 42 is installed in the location of a building provided with a security lock system or the like, which is unlocked through an authentication process performed by holding the mobile terminal over the reader writer 42 to exchange authentication information.

Then, the user is identified as the owner of the mobile terminal by the authentication result of the authentication section 22 to refer to the access permission, and the applications and devices executable in the area are changed on the basis of the access permission corresponding to the authority given to the user (administrator, standard user or the like), the positional information of the user (the position of the security lock) and the current time.

Figure 10:
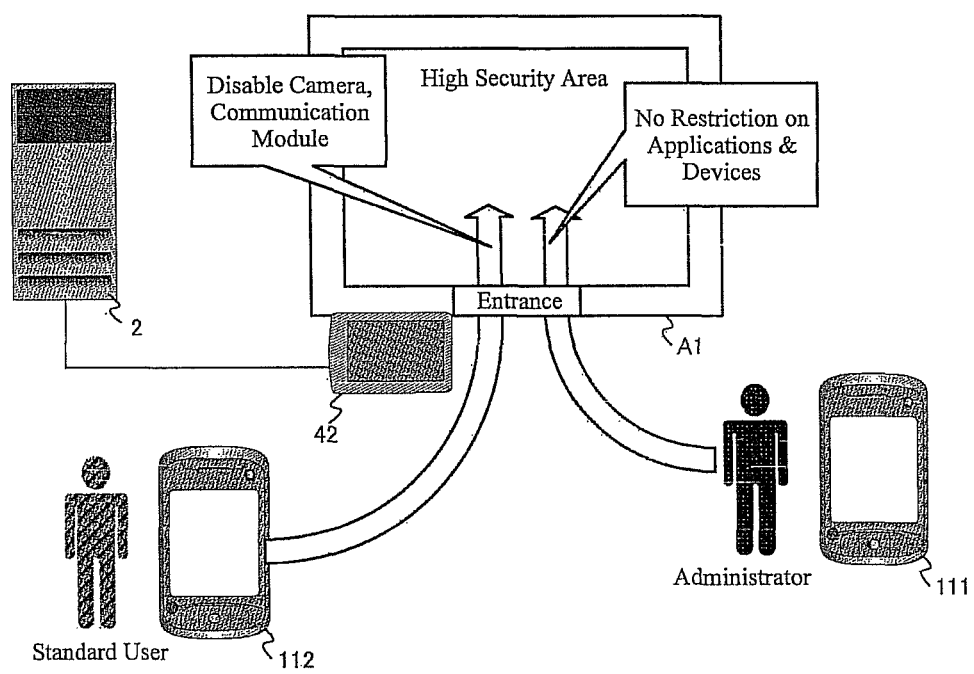
FIG. 10 is an explanatory view for showing the operation of authentication process and unlocking process of the service providing system in accordance with the embodiment.

For example, as illustrated in FIG. 10, the reader writer 42 is installed in a high security area A1 such as a factory, a research facility, an archives warehouse and so forth. The user performs an authentication process and an unlocking process in order to enter this area A1. Then, if the authentication is passed to unlock, execution of applications and devices is restricted in accordance with the authority of the user and the time slot. In this case, if the entering user is an administrator, no restriction is imposed on the applications and so forth, but if the user is a standard user, the operations of the applications and devices are restricted. Restriction in accordance with the time slot is, for example, not imposed during business hours of the store but imposed after business hours.

In the case of the present embodiment as described above, it is possible to control whether to run the application in accordance with the location and state of each user by performing user management with reference to the authentication result of the user and the authority to run applications and also in combination with the positional information. Particularly, since the positional information is generated by contactless communication with the base station 41, it is possible to control whether to run the application in accordance with the authentication relating to the entry into the building and the location of the user in the building, for example, by making use of the mobile terminal as a gate pass such that the security of entrance into a building and the security of data in the building can be centrally managed.

Incidentally, it is possible to change data security and the execution of the necessary applications in accordance with the work content variable depending on the day of a week and the time slot, and adjust the security level in response to time change by controlling the execution of the applications on the application executing section in accordance with the authentication result from the authentication section 22 and the time slot information which is generated with reference to the current time.

Furthermore, in the case of the mobile terminal 11 according to the present embodiment, it is possible to impose the restriction on each device provided in this terminal and the restriction on the execution of the applications in association with each other, and thereby the above applications can be remotely controlled to remotely control the devices associated therewith on the mobile terminal side such that the software and hardware of the mobile terminal can be collectively controlled in order to remotely control the functionality of the mobile terminal itself.

Viewing News

Figure 15:
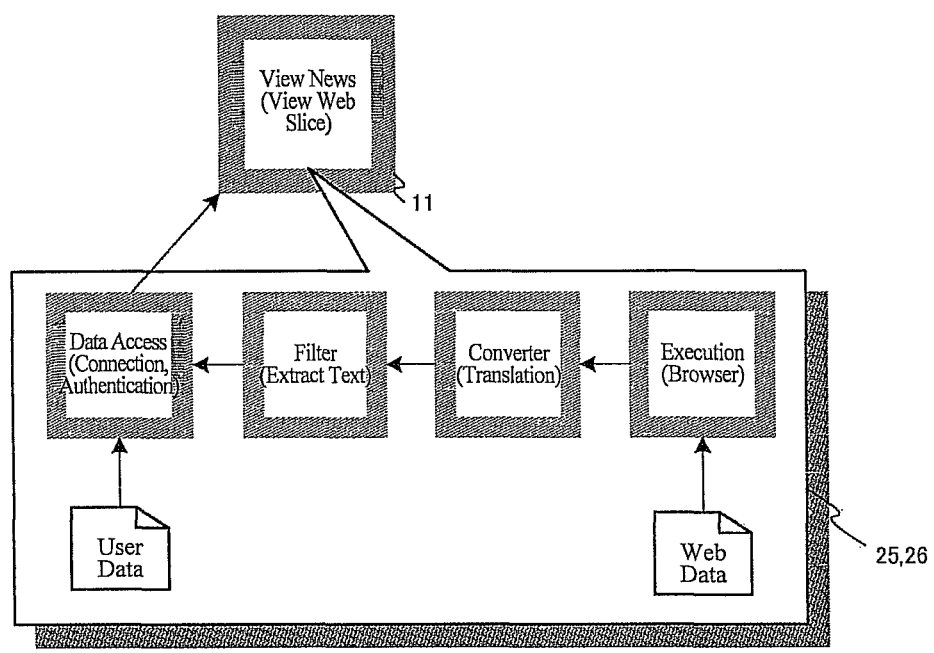
FIG. 15 is an explanatory view for showing the process definition of the news viewing service of the service providing system in accordance with the embodiment.

Text data such as news delivered as Web pages on the Internet can be provided by the data assembly service as described above. Specifically speaking, as illustrated in FIG. 15, first, the process management section 241 defines a process as a sequence of steps of running the functional units AP of the applications which are executed by the application executing section 26. This definition of process can be set up by arranging icons assigned to objects respectively as illustrated in the same figure. In this case, the sequence is set up to include invoking a browser which is an executable file, accessing Web data, language translating by the converter, extracting only text by the filter and performing data transmission to the mobile terminal 11 with user data.

Then, when acquiring Web data from Web sites as illustrated in FIG. 14, converted data is transmitted to the mobile terminals 11 by accessing a Web site (the server 32) through the data connector DC (S201) after performing, if necessary, language translation by the file converter FC (S202) and removal of unnecessary tag data and/or image data by the data filter DF (S203). The display data (user data) is displayed on this mobile terminal 11 in the format which is designated in advance by the user.

By this configuration, the mobile terminal 11 receives information which is reduced in data size by deleting unnecessary tags and images, such that it is possible to prevent an excessive communication processing burden and a delay in display processing.

Daily Business Report

Furthermore, the present system can be used for business work such as a business plan in a company, reporting the progress situation of the plans and so forth. In this case, as illustrated in FIG. 16, a system is provided for developing a daily report plan as a specific schedule (schedule data) relating to the business strategy that is worked out through a meeting of a superior and a subordinate or the like, and having the subordinate provide a daily report as to the progress situation of the schedule.

Figure 16:
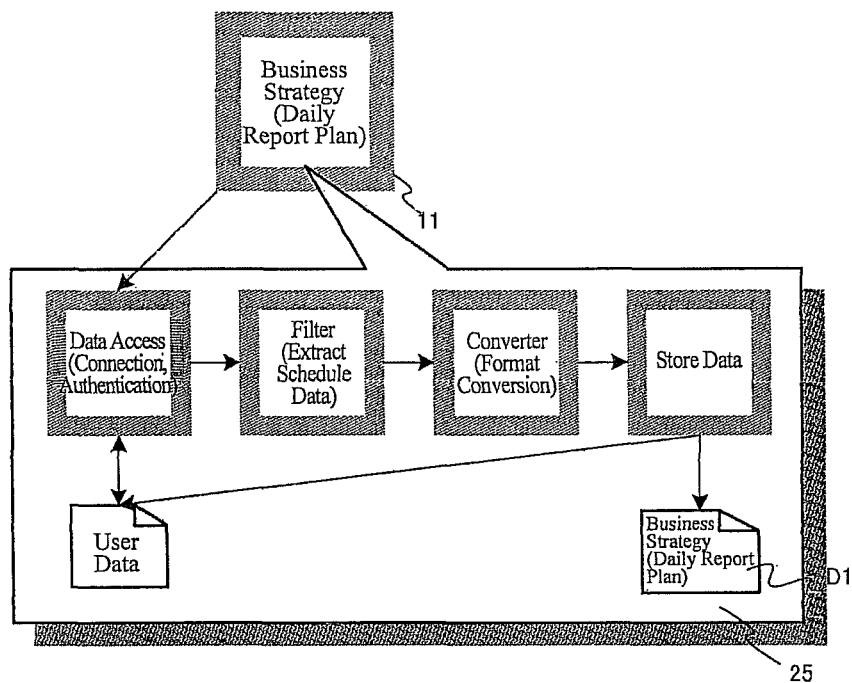
FIG. 16 is an explanatory view for showing the process definition of the business report service of the service providing system in accordance with the embodiment.
Figure 16:
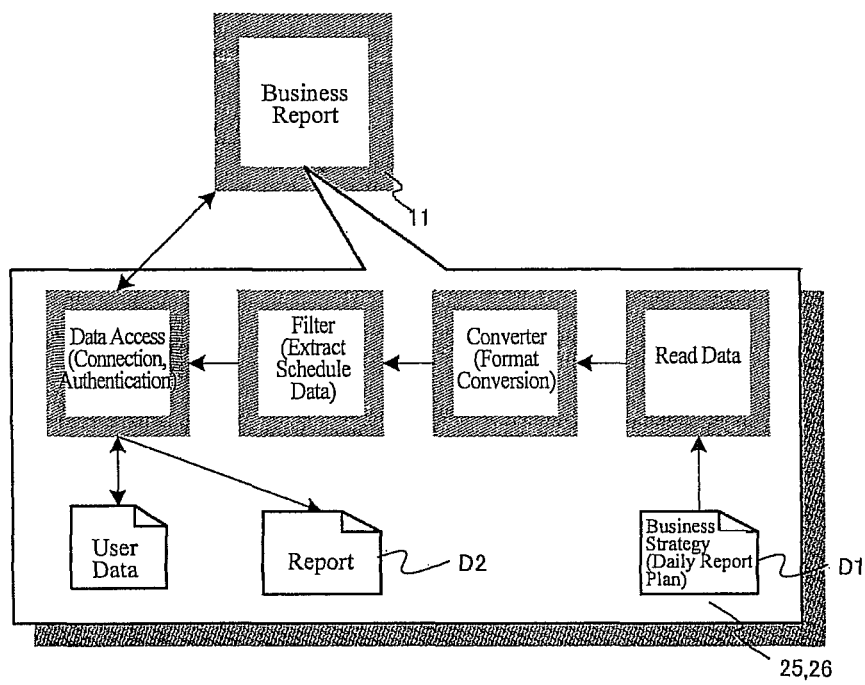
Figure 17:
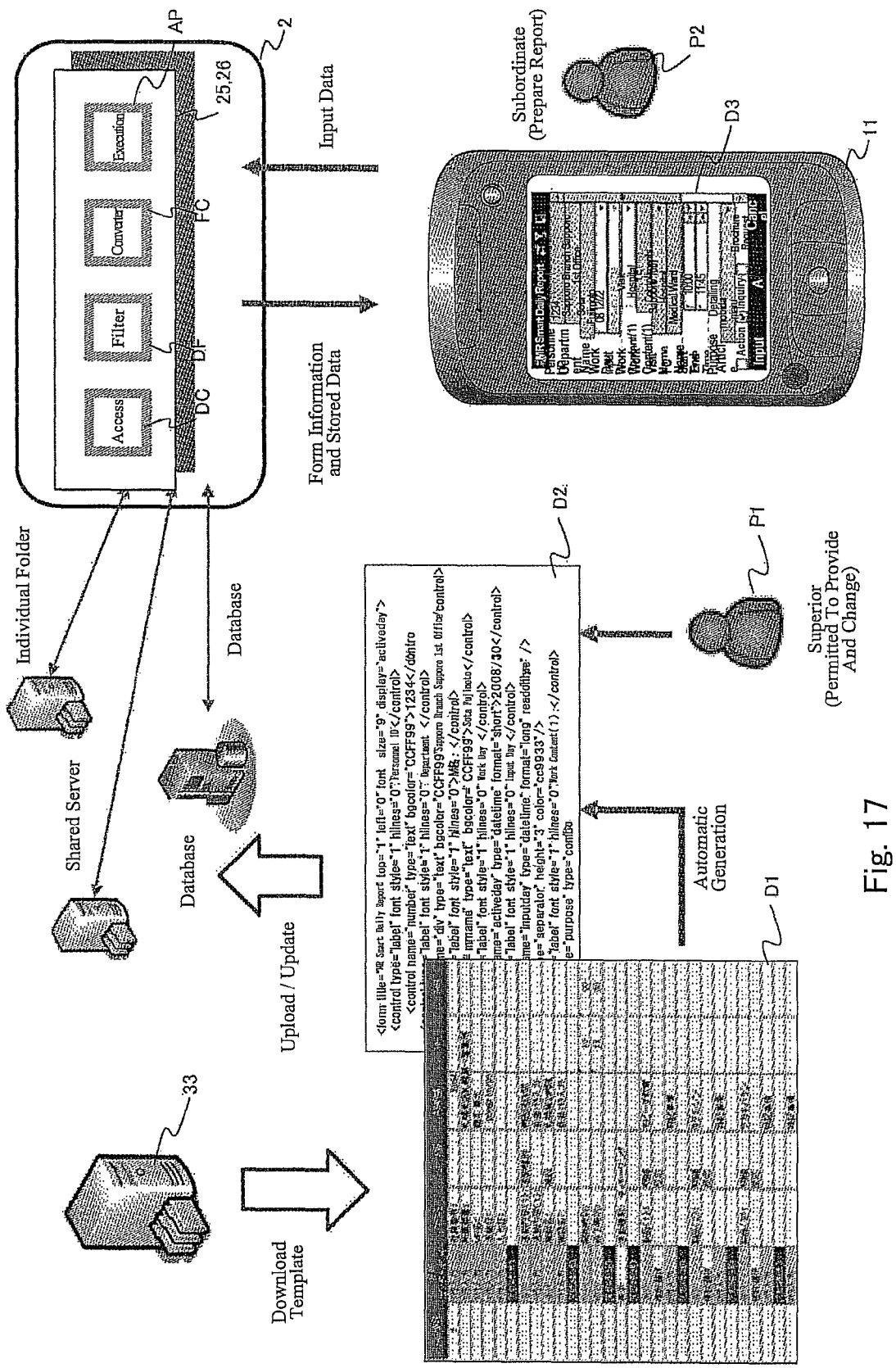
FIG. 17 is an explanatory view for showing the outline of the business report service of the service providing system in accordance with the embodiment.

Specifically, as illustrated in FIG. 16 and FIG. 17, the superior P1 provides a daily report plan D1 through a business strategy meeting. This daily report plan can be downloaded as a template from the server 33. This daily report plan includes table data in which the user information such as the names, IDs, departments and the like of personnel is associated with the names of companies as business targets, visit times, purposes of visit and the like. The daily report plan D1 provided in this manner can be accessed from the management server 2 by uploading it to a shared server or the like, and is converted into a report D3 by data conversion and filtering. The conversion into this report D3 is performed by converting the daily report plan D1 into intermediate data D2 in a standard data format such as XML, extracting necessary data items from this intermediate data D2, and applying the extracted data to a template to reflect the daily report plan in this report.

More specifically speaking, the component section 25 authenticates the superior P1 and the subordinate P2 by the authentication section 22 through the process management section 24. This process identifies the user (superior P1) who has the authority to input the daily report plan or the subordinate P2 who is required to report. The component section 25 switches the process of inputting and outputting the same data file (the daily report plan) in accordance with the user ID of this identified user (superior P1 or subordinate P2), and converts the data on the basis of the process switched in accordance with the identifier of the user. In this case, the process is switched, for example, as to whether to give the authority to edit the daily report plan in accordance with which the user is the superior P1 or the subordinate P2, and if the user is the subordinate P2 the conversion process of the report is permitted.

The report D3 which is provided here is data for displaying the data of the daily report plan together with a data inputting format. The inputting format includes input lines in which a report can be written in correspondence with scheduled data. The data input as a business report D3 is converted and stored, for example, as user data in a shared database to indicate that the business operation is finished (procedure for completion). In this case, the data saving format and saving location can be changed in accordance with the definition of the process and the settings of objects.

As has been discussed above, since the report includes visit destinations for business operation, visit times and purposes of visit which are described in the daily report plan, the subordinate P2 can make up the report by inputting only the minimum information such as the time at which the business started, the time at which the business ended and so forth on the screen of the mobile terminal 11. The time can be automatically input, if it is the current time, by the clock function of the mobile terminal 11, so that the manipulation is further simplified.

EXPLANATION OF REFERENCE

AP . . . functional unit of application
D1 . . . daily report plan
D2 . . . intermediate data
D3 . . . business report
DC . . . data connector
DF . . . data filter
FC . . . file converter
P1 . . . superior
P2 . . . subordinate
SD . . . service delegate
2 . . . management server
4 . . . communication network
11 . . . mobile terminal
11a . . . positional information generation section
11b . . . application operation section
11c . . . digital camera
12 . . . PC (mobile)
13 . . . PC terminal
21 . . . communication server
21a . . . application remote control section
21b . . . streaming delivering section
22 . . . authentication section
23 . . . user database
24 . . . service management section
24a . . . positional information management section
24b . . . time slot information management section
24c . . . security map
25 . . . components section
26 . . . application executing section
27 . . . management database
28 . . . management section
31 . . . customer server
32 . . . external server
33 . . . third party server
41 . . . base station
42 . . . reader writer
43 . . . satellite
241 . . . process management section
251 . . . data assembly section

The invention claimed is:

1. A system for providing mobile service including a plurality of mobile terminals and a communication server which can be accessed from the mobile terminals, said system comprising:

an application executing section connected to the communication server located in a communication network and operable to execute the executable file of an application;

a component section operable to execute the application by the application executing section on the basis of operation data from the mobile terminal, and transmit the execution result to the mobile terminal so that the application running on the communication server can remotely be controlled by the mobile terminal;

an authentication section operable to perform authentication of the user of each of the mobile terminals;

a service management section operable to accumulate either of a configuration file of the application and a data file to be used by the application, and provide the configuration file or the data file to the mobile terminal from the communication server in the communication network, in accordance with the authentication result from the authentication section, and control connection between the component section and the mobile terminal; and an application operation section operable to receive and display the execution result from the application executing section on the mobile terminal, and transmit the operation data to the communication server in response to user operation, wherein the component section further comprises:

a process management function of defining a process as a sequence of steps of running functional units of the application which is executed by the application executing section;

a data conversion function of converting data formats or filtering data in order that intermediate data exchanged between the functional units can be processed by the functional unit to be executed next;

a class providing function of selecting and executing the data conversion function in correspondence with the functional unit to be executed next on the basis of the process defined by a process setting function, and adding a new function to the functional unit or overwriting a function of a functional unit, when executing the functional unit, and wherein when providing the data files, the component section performs, through the service management section, switching the process of inputting and outputting the same data file in accordance with the identifier of the user authenticated by the authentication section, converting the data on the basis of the process switched in accordance with the identifier of the user, and displaying the data with a data displaying format.

2. The system for providing mobile service as claimed in claim 1, wherein the service management section controls whether to run the application for each user and whether to make the icon of the application visible or invisible, and wherein the application operation section displays executable applications as executable icons and applications which cannot be run at the present time but will be executable after performing a setting process as waiting icons, and hides the other applications which are inhibited from being connected.

3. The system for providing mobile service as claimed in claim 1, wherein the service management section comprising:

a network cooperation section operable to cooperate with Web services which are dispersedly located in a communication network; and a management database operable to store and hold the service authentication information unique to the Web services in association with the users respectively, wherein service authentication information unique to the each Web service is acquired on the basis of the authentication result from the authentication section and, when each of the Web services is accessed, the network cooperation section perform an authentication process for the each Web service by the use of the service authentication information corresponding to the each Web service.

4. The system for providing mobile service as claimed in claim 1, wherein the mobile terminal is provided with a positional information generation section which identifies the position of the terminal itself, generates the identified information as positional information, and transmits the positional information to the communication server, and wherein the application executing section is provided with a positional information management section which controls execution of the application in accordance with the positional information and the authentication result from the authentication section.

5. The system for providing mobile service as claimed in claim 4, wherein the positional information generation section generates the positional information through contactless communication with a reader writer which performs the authentication of the mobile terminal.

6. The system for providing mobile service as claimed in claim 1, wherein the application executing section is provided with a time slot information management section which generates current time information as time slot information and controls execution of the application by the application executing section in accordance with the time slot information and the authentication result from the authentication section.

7. The system for providing mobile service as claimed in claim 4, wherein the restriction on each device provided in the mobile terminal and the restriction on the execution of the applications can be imposed in association with each other on the mobile terminal.

8. The system for providing mobile service as claimed in claim 1, wherein the service management section is provided with the function of, when providing the data files, determining the type of the user terminal as the accessing terminal, and mutually converting the accumulated data files on the basis of the determination result in order that the accessing terminal can utilize the data files.

9. The system for providing mobile service as claimed in claim 1, wherein when imposing restriction on the connection with the mobile terminal, the service management section performs a charging process in accordance with the amount of data transmitted and received through the connection with the mobile terminal on the basis of the restriction for each user identified in accordance with the authentication result from the authentication section.

10. The system for providing mobile service as claimed in claim 1, wherein the data to be input and output is scheduled data relating to a business plan, wherein the data inputting format is a business report with a field in which a report is input in correspondence with the scheduled data, and wherein the data input through the data inputting format as the business report is converted and stored in a storing format to complete the procedure.

11. The system for providing mobile service as claimed in claim 1, wherein when providing the data files, the component section performs, through the service management section, accessing the data on the Web in accordance with the process, acquiring and converting the data on the Web, and displaying the data with the data displaying format.

12. A method for providing mobile service to a plurality of mobile terminals through a communication server which can be accessed from the mobile terminals, said method comprising:

a step (1) of transmitting operation data to the communication server in response to user operations on the mobile terminals, and performing authentication of the user of each of the mobile terminals by the authentication section connected to the communication server located in a communication network;

a step (2) of accumulating either of a configuration file of an application and a data file to be used by the application, providing the configuration file or the data file to the mobile terminal in accordance with the authentication result from the authentication section, and controlling connection between the component section and the mobile terminal from the communication server in the communication network, this step (2) being performed by a service management section connected to the communication server;

a step (3) of executing the executable file of an application on the basis of operation data from the mobile terminal by an application executing section, and transmitting the execution result from the application executing section to the mobile terminal by a component section, such that the application running on the communication server located in a communication network can remotely be controlled by the mobile terminal;

a step (4) of receiving and displaying the execution result from the application executing section on the mobile terminal, wherein when providing the data files in the step (2), the component section performs, through the service management section, switching the process of inputting and outputting the same data file in accordance with the identifier of the user authenticated by the authentication section, converting the data on the basis of the process switched in accordance with the identifier of the user, and displaying the data with a data displaying format, and wherein, in the step (3), the component section performs, by a process management function, defining a process as a sequence of steps of running functional units of the application which is executed by the application executing section by a data conversion function, converting data formats or filtering data in order that intermediate data exchanged between the functional units can be processed by the functional unit to be executed next; and by a class providing function, selecting and executing the data conversion function in correspondence with the functional unit to be executed next on the basis of the process defined by a process setting function, and adding a new function to the functional unit or overwriting a function of a functional unit, when executing the functional unit.

13. The method for providing mobile service as claimed in claim 12, wherein the service management section performs, in the step (2), controlling whether to run the application for each user and whether to make the icon of the application visible or invisible, and in the application operation section, displaying executable applications as executable icons and applications which cannot be run at the present time but will be executable after performing a setting process as waiting icons, and hides the other applications which are inhibited from being connected.

14. The method for providing mobile service as claimed in claim 12, further comprising:

a step of performing cooperation of the service management section with Web services which are dispersedly located in a communication network;

a step of storing and holding service authentication information unique to the Web services in a management database by the service management section in association with the users respectively; and a step of acquiring service authentication information unique to the each Web service by the service management section on the basis of the authentication result from the authentication section and, when each of the Web services is accessed, performing an authentication process for the each Web service by the network cooperation section by the use of the service authentication information corresponding to the each Web service.

15. The method for providing mobile service as claimed in claim 12, further comprising a step of, in advance of the step (3), identifying the position of the mobile terminal by the terminal itself, generating the identified information as positional information, and transmitting the positional information to the communication server, wherein in the step (3), execution of the application by the application executing section is controlled in accordance with the positional information and the authentication result from the authentication section.

16. The method for providing mobile service as claimed in claim 15 wherein the positional information is generated through contactless communication with a reader writer which performs the authentication of the mobile terminal.

17. The method for providing mobile service as claimed in claim 12, further comprising a step of, in advance of the step (3), generating current time information as time slot information, wherein in the step (3), execution of the application by the application executing section is controlled in accordance with the time slot information and the authentication result from the authentication section.

18. The method for providing mobile service as claimed in claim 15, wherein the restriction on each device provided in the mobile terminal and the restriction on the execution of the applications can be imposed in association with each other on the mobile terminal.

19. The method for providing mobile service as claimed in claim 12, wherein when providing the data files in the step (2), the service management section performs determining the type of the user terminal as the accessing terminal, and mutually converting the accumulated data files on the basis of the determination result in order that the accessing terminal can utilize the data files.

20. The method for providing mobile service as claimed in claim 12, wherein when imposing restriction on the connection with the mobile terminal in the step (2), the service management section performs a charging process in accordance with the amount of data transmitted and received through the connection with the mobile terminal on the basis of the restriction for each user identified in accordance with the authentication result from the authentication section.

21. The method for providing mobile service as claimed in claim 12, wherein when providing the data files in the step (2), the component section performs, through the service management section, switching the process of inputting and outputting the same data file in accordance with the identifier of the user authenticated by the authentication section, converting the data on the basis of the process switched in accordance with the identifier of the user, and displaying the data with a data displaying format.

22. The method for providing mobile service as claimed in claim 21, wherein the data to be input and output is scheduled data relating to a business plan, wherein the data inputting format is a business report with a field in which a report is input in correspondence with the scheduled data, and wherein the data input through the data inputting format as the business report is converted and stored in a storing format to complete the procedure.

23. The method for providing mobile service as claimed in claim 12, wherein when providing the data files in the step (2), the component section performs, through the service management section, accessing the data on the Web in accordance with the process, acquiring and converting the data on the Web, displaying the converted data, and changing the saving format and saving location of the data input through the data inputting format.

\* \* \* \* \*